United States Patent [19]
Whitefield

[11] Patent Number: 6,035,770
[45] Date of Patent: Mar. 14, 2000

[54] BARBECUING AND SMOKING DEVICE

[76] Inventor: Robert Whitefield, 17515 197th Ave. NE., Woodinville, Wash. 98072

[21] Appl. No.: 09/083,958

[22] Filed: May 22, 1998

[51] Int. Cl.[7] .................................................. A23B 4/044
[52] U.S. Cl. ................................................ 99/482; 99/467
[58] Field of Search ............................. 99/482, 481, 467, 99/385, 447

[56] References Cited

U.S. PATENT DOCUMENTS

| | | | |
|---|---|---|---|
| 3,517,602 | 6/1970 | Horton | 99/482 |
| 3,699,876 | 10/1972 | Ellis | 99/259 |
| 3,776,127 | 12/1973 | Muse | 99/482 |
| 3,841,211 | 10/1974 | Ellis | 99/482 |
| 4,130,052 | 12/1978 | Jacobson | 99/339 |
| 4,757,756 | 7/1988 | Van Marr | 99/482 |
| 5,195,423 | 3/1993 | Beller | 99/340 |
| 5,368,872 | 11/1994 | Davis, Jr. | 425/281 |
| 5,718,165 | 2/1998 | Winstead | 99/482 |

*Primary Examiner*—Reginald L. Alexander
*Attorney, Agent, or Firm*—Richardson & Folise

[57] ABSTRACT

A barbecuing and smoking device for smoking and cooking meats and other foods. The device includes a housing having a base, a removable lid, at least one food rack mounted within the housing and a chimney mounted to the lid. A heat source, preferably an electrical heating element, is mounted to a heat shield and positioned in the base. A container for a smoke producing substance such as wood chips is slidably mounted in the housing above the heating element and horizontally removable from the housing through an opening in the base for replenishment of the wood chips.

15 Claims, 3 Drawing Sheets

BARBECUING AND SMOKING DEVICE

BACKGROUND OF THE INVENTION

This invention generally relates to cooking devices and more particularly to a portable barbecuing and smoking device for indoor cooking of meats and other foods.

Barbecuing is a traditional cooking process which has probably been in use for centuries. Essentially the process involves the cooking of foods by exposing them to relatively low temperature smoke for a number of hours. Meat cuts such as briskets and roasts which are tenderized by lengthy cooking are particularly amendable to barbecuing.

Many people confuse barbecuing with the broiling/grilling process employed with the typical backyard grill. In the broiling process food is cooked by exposing it to direct radiation and high temperature convective currents generated by burning fuel such as charcoal briquettes. In contrast in the barbecue process direct exposure of the cooking food to the heat source is avoided.

The type of structure used for barbecuing normally includes a fire pit, a cooking section and a conduit or flue through which smoke and heated combustion gases are transported from the fire pit to the cooking section. The structure also includes a chimney through which the smoke and gases are exhausted after passing through the cooking section. Smoke and heat is produced by burning a smoke producing substance in the fire pit such as wet or green wood, which is periodically replenished, until cooking is completed.

The most desirable heat range for barbecuing is about 180° F. to 250° F. so the cooking section must be located far enough downstream from the fire pit that the temperature of the gases and smoke has decreased to within that range. Because of the spacing required between the fire pit and the cooking section, barbecuing devices tend to be relatively large and cumbersome as compared to higher temperature cooking devices. Traditionally barbecuing devices have been constructed of brick or stone. Because of their mass and because of the heat and smoke produced in the process, they are preferably located out of doors. As a result enjoyment of barbecuing at home has been limited to those few who have the facilities to accommodate such a device. Further because of their size and cost of construction it is difficult for most people to justify building such a device to cook relatively modest amounts of food consumed by a family. Smaller portable barbecuing devices have appeared on the market from time to time but they have had a number of deficiencies. First, most are still large enough that they are practically limited to outdoor use. Secondly, most emit substantial amounts of smoke and combustion gases from various places in their structures, making it difficult to contain the gases and impractical to use them indoors.

Another problem encountered with many of these smaller devices is that they must be periodically opened in order to replenish the smoking substance. When they are opened, a significant amount of heat is lost and the temperature in the cooking section declines substantially. The added smoking substance must then be elevated to kindling temperature and the cooking section must then be brought back up to proper cooking temperature. As a result the cooking process is disrupted and many minutes of cooking time are lost.

Accordingly it is a principle object of this invention to provide for a compact portable barbecuing and smoking device which is practical to use in either an indoor or outdoor environment.

It is another object of this invention to provide for a barbecuing and smoking device which is suitable for use on a typical kitchen range top where the smoke and combustion gases produced in the barbecuing process can be exhausted by the range hood.

A further object of this invention is to provide for a barbecuing and smoking device in which the smoking substance can be replenished without causing significant temperature loss in the cooking section.

It is yet another object of this invention to provide for a barbecuing and smoking device which can be produced and sold at a modest price, thereby making it available to the average family.

SUMMARY OF THE INVENTION

This invention can be broadly summarized as providing for a barbecuing and smoking device which includes a housing having a base, a lid mountable on the base, a food rack mounted within the housing and a chimney for venting the housing. The device also includes a heat source mounted within the housing and a container for a smoke producing substance such as wood positioned above the heat source and horizontally removable through an opening in the side of the housing. In one embodiment of the invention the heat source includes an electrical heating element and in another it includes a burner for a combustible gas such as natural gas.

In accordance with more detailed aspects of the invention, the device also includes a heat shield positioned beneath the heat source. According to yet more detailed aspects of the invention, the container is slidably mountable in the housing and extends through the opening in the side of the housing and the heat shield includes a pair of spaced sides which guides the drawer into the housing.

DESCRIPTION OF THE PREFERRED EMBODIMENTS

Figure 1:
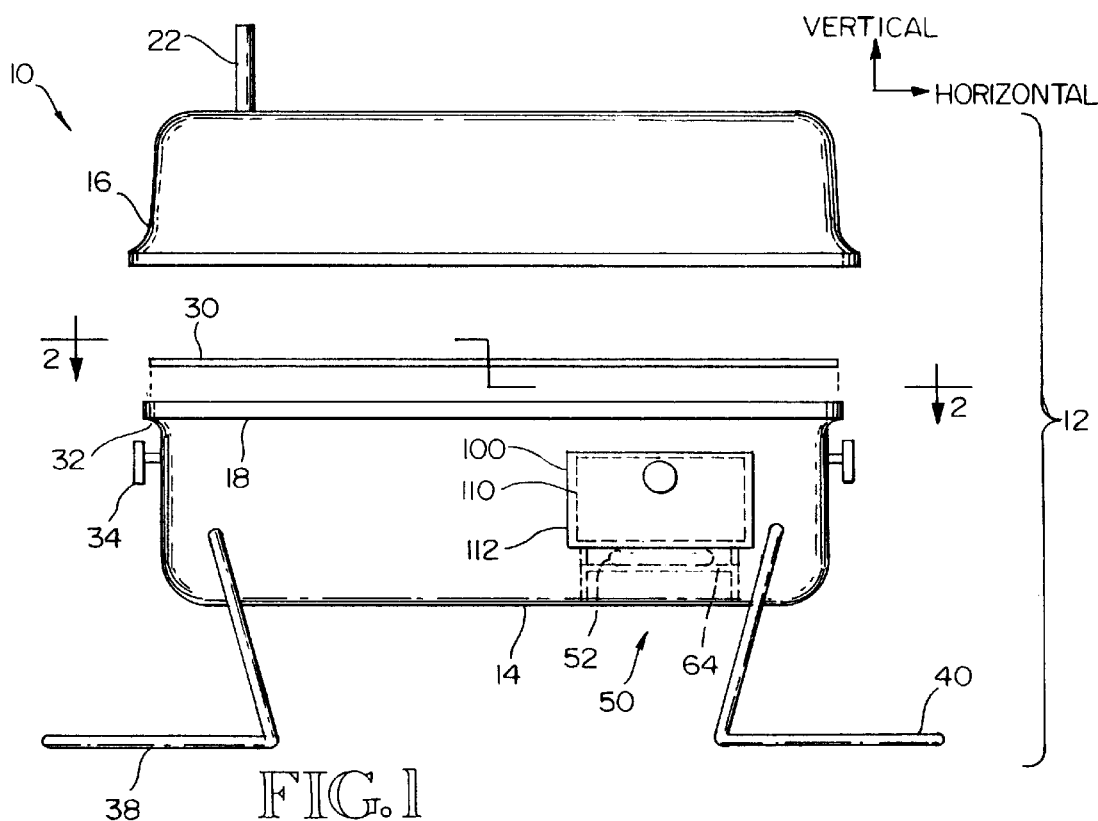
FIG. 1 is a front view, partly exploded, of a barbecuing and smoking device constructed in accordance with the teachings of the present invention.
Figure 2:
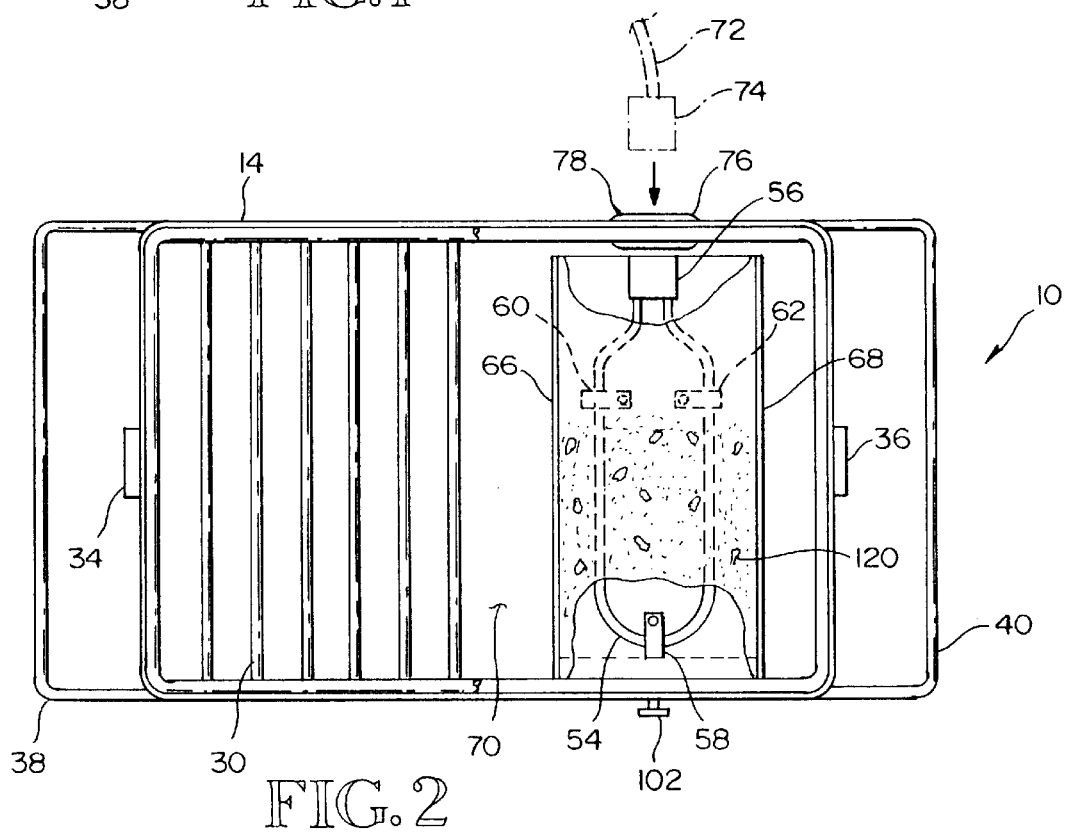
FIG. 2 is a sectional view taken at 2—2 of FIG. 1.

The novel features believed to be characteristic of this invention are set forth in the appended claims. The invention itself, however, may be best understood and its various objects and advantages best appreciated by reference to the detailed description below in connection with the accompanying drawings.

FIGS. 1 through 4 illustrate a barbecuing and smoking device constructed in accordance with the teachings of the present invention and generally designated by the numeral 10. The device includes a housing 12 having a base 14 and a removable lid 16. Gasket 18 which is preferably formed of heat resilient silicone rubber is mounted to the upper edge of base 14. When the lid is positioned on the base, flared lower edge 20 of the lid seats on the gasket so as to substantially seal the interface between the base and the lid. The purpose for the sealing feature is to substantially eliminate the leakage of smoke and gases from between the lid and the base when the device is in operation. When the lid is seated on the base, they cooperate to define a cooking and smoking compartment therewithin. Chimney 22 which is mounted near the left hand end of lid 16 provides communication between the compartment and the exterior atmosphere surrounding the device and provides a means to vent smoke and gases generated within the device when it is in operation.

Rack 30 which is removably positioned on flared upper edge 32 of base 14 provides a surface on which meat and other foods to be cooked can be placed. Insulating handles 34 and 36 are attached to opposing ends of base 14 permitting it to be moved from place to place. Housing 12 is supported by legs 38 and 40 which are pivotally mounted in holes (not shown) formed in base 14.

A significant aspect of the present invention is smoke generating apparatus 50 which is mounted in base 14. The apparatus preferably includes electrical heater 52 which includes heating element 54 and electrical receptacle 56. Electrical heater 52 is attached by clamps 58, 60 and 62 to heat shield 64. Heat shield 64 includes two parallel oriented downwardly extending flanges 66 and 68 which rest against the bottom surface 70 of base 14. The purpose of the heat shield is to reflect heat produced by the heater upward which would otherwise be transmitted downward into base 14 and to support the smoke generating apparatus on surface 70.

Power is provided to the electrical heater through power cord 72 and plug 74 which is insertable through opening 76. Leakage of smoke and gases around the plug minimized by gasket 78 which is mounted in cutout 76 in the base. Electrical heating element 54, receptacle 56, power cord 72 and plug 74 are of conventional design well known to those of ordinary skill in the art and therefore need not be described in greater detail.

Figure 3:
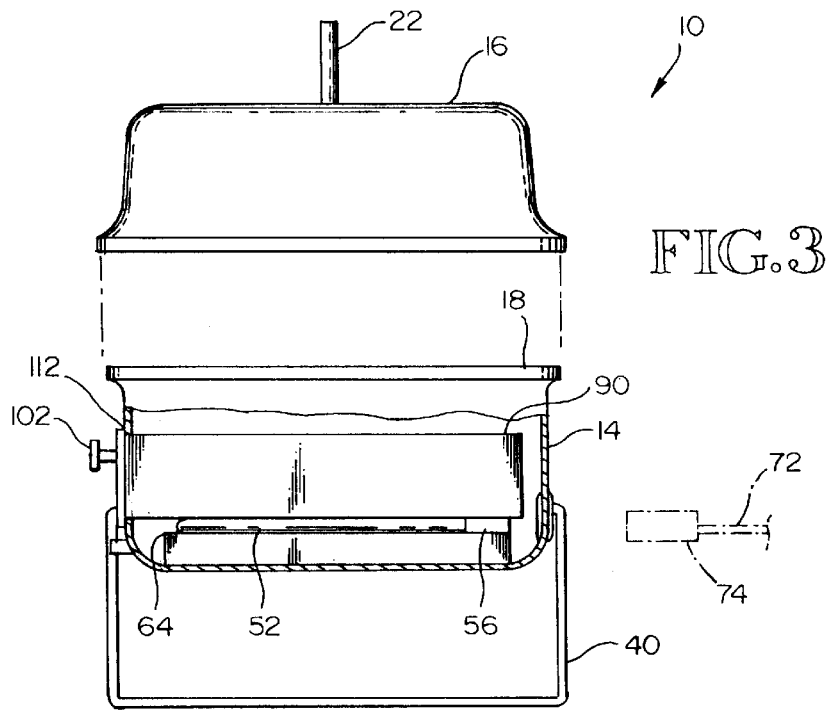
FIG. 3 is a right side view of the invention partially exploded and broken away.
Figure 4:
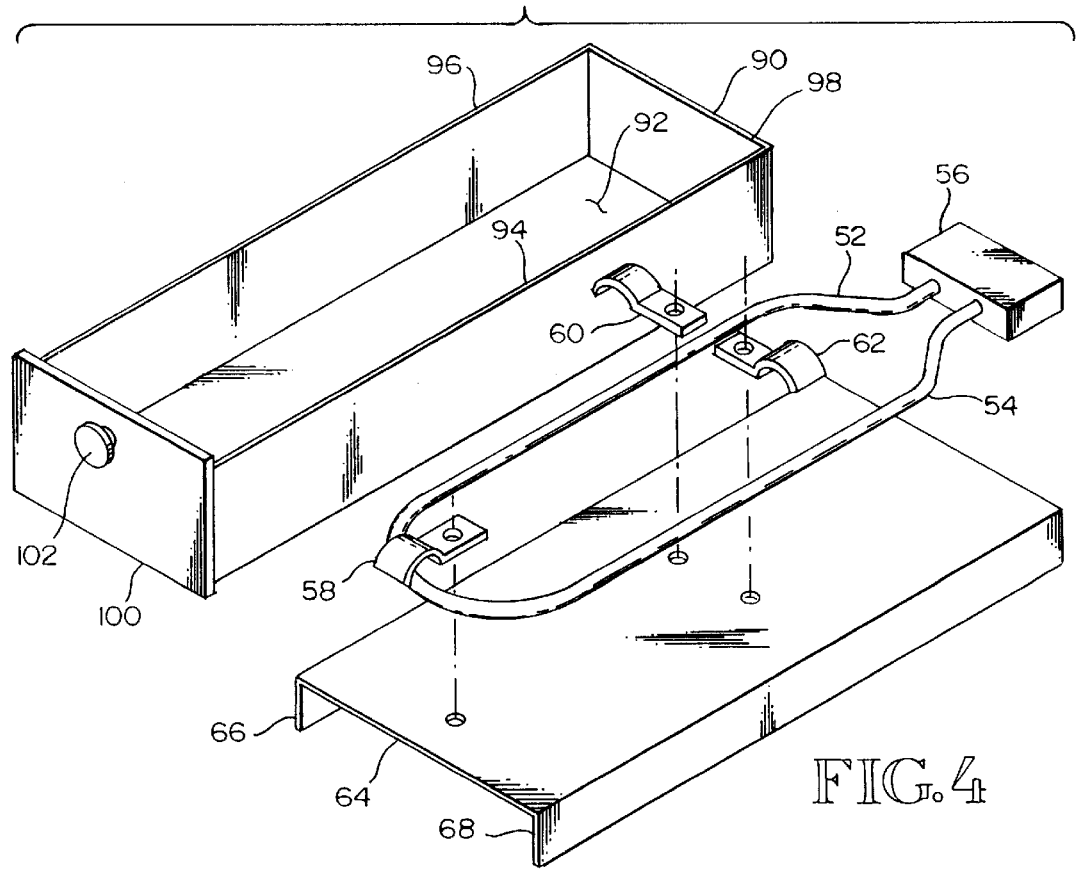
FIG. 4 is an exploded perspective view of the preferred embodiment showing the container for a smoke producing substance, the electrical heating element and the heat shield.

Another component of the smoke generating apparatus is container 90 which is illustrated in greater detail in FIG. 4. As can be seen the container is preferably shaped like a drawer having a bottom 92, opposing sides 94 and 96 and end 98 and a face 100. Insulated knob 102 is mounted to the face. The container is slidable mountable in the housing through rectangular opening 110 formed in base 14 and when fully inserted in the housing as shown in FIG. 3 it rests atop electrical heater 52. Gasket 112 which is mounted to base 14 and surrounds opening 110 minimizes the leakage of smoke and gases between the opening and container face 100 during operation.

In operation, container 90 is first removed from base 14 and filled with a suitable smoke producing substance 120 such as wet wood chips. Hickory and mesquite are two woods popular with barbecue aficionados for such use. Container 90 is then inserted through opening 110 until face 100 seats against gasket 112. Next, power is supplied to electrical heater 54 by inserting plug 74 through opening 76 into receptacle 56. As the temperature of element 54 rises, heat is transmitted to bottom 92 of the container until the wood chips being to smolder. The wattage of the heating element should be selected so that the bottom of the container will ultimately stabilize at about 700° C. which will cause the wood chips to smolder but not burst into flame. Food to be cooked is appropriately positioned on rack 30 and lid 16 is seated on the base. Because the smoke generating apparatus is positioned near the right hand side of base 14 and chimney 22 is positioned toward the left hand side of the lid, smoke produced will tend to rise and flow to the left, passing around food items on the rack and then continue upward through chimney 22. Ideally the temperature of the cooking compartment should stabilize at about 225° F.

Periodically when the wood chips have been consumed container 90 is removed from the base and refilled. A very significant advantage of the present invention is that the supply of wood chips can be replenished without removing lid 16 or causing significant loss of heat within the housing.

Figure 5:
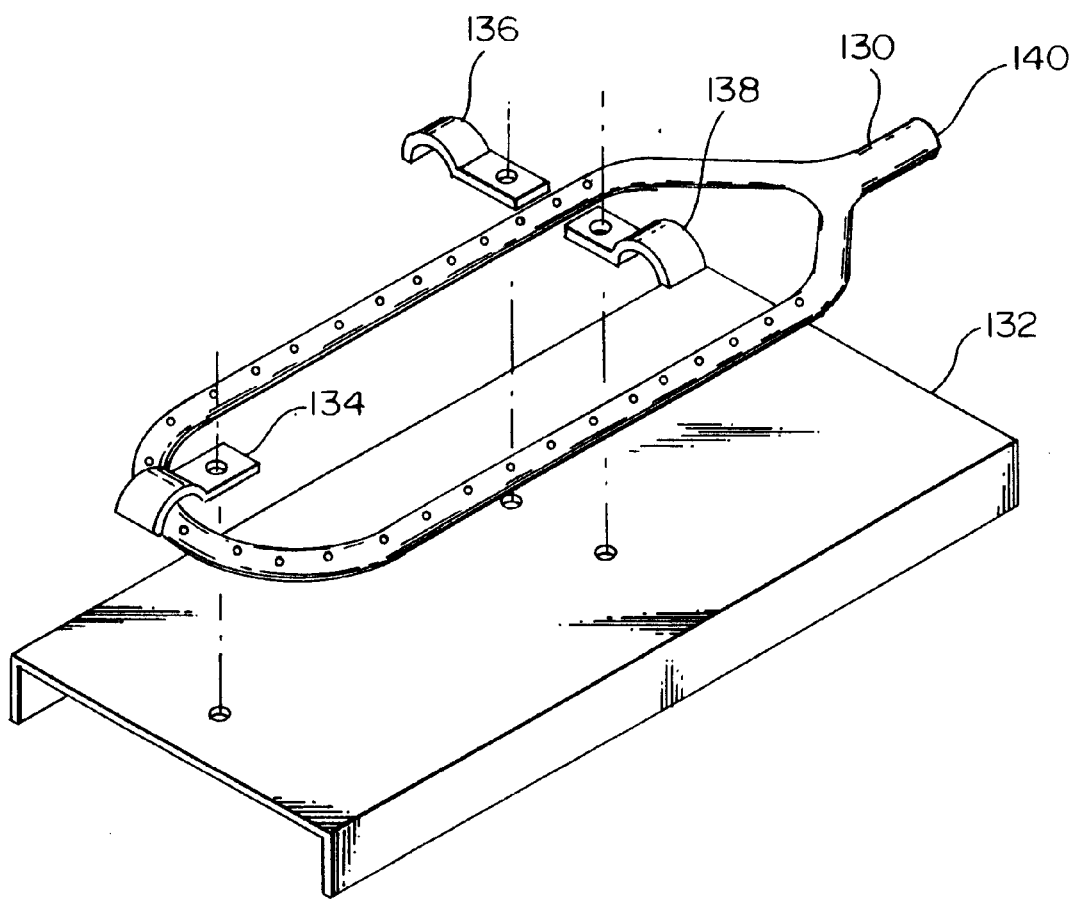
FIG. 5 is an exploded perspective view of the gas burner and heat shield of the second embodiment.

A second embodiment of the present invention is illustrated in FIG. 5. In that embodiment the heat source for the smoke generating apparatus is burner 130 which is adapted to burn natural gas, propane or another combustible gas suitable for cooking. The burner is mounted to heat shield 132 which is similar in design to heat shield 64 by clamps 134, 136 and 138. Combustible gas is supplied to burner end 140 which is internally threaded to receive conventional gas fittings as is well known to those of ordinary skill.

Thus it can seem that the present invention provides for an improved barbecuing and smoking device which incorporates many novel features and offer significant advantages over the prior art. Although only two embodiments have been illustrated and described it is to be understood that obvious modifications can be made of it without departing from the true scope and spirit of the invention.

I claim:

1. A barbecuing and smoking device comprising:

a housing defining a smoking and cooking compartment there within, the housing including a base, a lid mountable on the base and providing access to the compartment, at least one food rack disposed within the compartment, a chimney for venting the compartment and a side having an opening formed therein;

a heat source mounted within the compartment; and, a container slidably mountable above the heat source and horizontally removable from the housing through opening, the container including a compartment for a smoke producing substance having an unvented bottom portion disposed vertically above the heat source such that a line extending bottom portion when the container is fully inserted in the housing preventing the passage of gasses there through.

2. The device of claim 1 wherein the heat source is an electrical heating element.

3. The device of claim 1 further including a heat shield disposed beneath the heat source.

4. The device of claim 2 further including a heat shield mounted to the electrical heating element.

5. The device of claim 1 wherein the chimney is mounted to the lid.

6. The device of claim 3 wherein the heat shield includes a pair of downwardly extending spaced flanges for supporting the heat shield in the housing.

7. The device of claim 1 wherein the opening is generally rectangular in shape.

8. The device in claim 1 wherein the container includes a face covering the opening when the container is inserted in the opening.

9. The device of claim 1 wherein the container sealably engages the housing when the container is inserted in the housing.

10. The device of claim 1 wherein the heat source is a burner for a combustible gas.

11. The device of claim 10 further including a heat shield disposed beneath the burner, the heat shield including a pair of downwardly extending spaces flanges for supporting the heat shield in the housing.

12. A barbecuing and smoking device comprising:

a housing defining a smoking and cooking compartment therewithin, the housing including a removable lid providing access to the compartment, at least one food rack disposed within the compartment, a chimney mounted to the lid for venting the compartment and a side having an opening formed therein;

an electrical heating element mounted with the housing;

a heat shield disposed beneath the electrical heating element; and, a container slidably mountable above the electrical heating element and horizontally removable from the housing through the opening, the container including a compartment for a smoke producing substance having an unvented bottom portion disposed vertically above the heat source such that a line extending vertically upward from the heat source passes through the unvented bottom portion when the container is fully inserted in the housing preventing the passage of gasses therethrough.

13. A barbecuing and smoking device comprising:

a housing defining a smoking and cooking compartment therewithin, the housing including a base, a removable lid mountable on the base and providing access to the compartment, a gasket disposed between the lid and the base, a chimney mounted to the lid for venting the compartment and a side having a generally rectangular opening formed therein;

an electrical heating element positioned within the housing;

a container for a smoke producing substance slidably mountable in the housing, disposed above the electrical heating element and horizontally removable from the housing through the opening, the container including a face covering the opening when the drawer is fully inserted in the opening; and, a heat shield positioned beneath and mounted to the electrical heating element, the heat shield supporting the heating element within the housing.

14. A barbecuing and smoking device comprising:

a housing defining a smoking and cooking compartment there within, the housing including a base, a lid mountable on the base and providing access to the compartment, a gasket disposed between the lid and the base, at least one food rack disposed within the compartment, a chimney for venting the compartment and a side having an opening formed therein;

a heat source mounted with the compartment; and, a container for a smoke producing substance disposed above the heat source and horizontally removable from the housing through the opening.

15. A barbecuing and smoking device comprising:

a housing defining a smoking and cooking compartment there within, the housing including a base, a lid mountable on the base and providing access to the compartment, a gasket disposed between the lid and the base and mounted to the base, at least one food rack disposed within the compartment, a chimney for venting the compartment and a side having an opening formed therein;

a heat source mounted within the compartment; and, a container for a smoke producing substance disposed above the heat source and horizontally removable from the housing through the opening.

* * * * *